(12) United States Patent
Lee

(10) Patent No.: US 8,362,910 B2
(45) Date of Patent: Jan. 29, 2013

(54) DIGITAL ELECTRONIC APPARATUS

(75) Inventor: Cheng-Hao Lee, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 829 days.

(21) Appl. No.: 12/500,770

(22) Filed: Jul. 10, 2009

(65) Prior Publication Data

US 2010/0277327 A1    Nov. 4, 2010

(30) Foreign Application Priority Data

Apr. 29, 2009 (TW) ................................ 98114283 A

(51) Int. Cl.
     *G08B 21/00*      (2006.01)
(52) U.S. Cl. ........... 340/636.19; 340/636.16; 340/636.1; 340/641
(58) Field of Classification Search ............... 340/636.1, 340/636.19, 641
See application file for complete search history.

(56) References Cited

U.S. PATENT DOCUMENTS

| | | | | |
|---|---|---|---|---|
| 4,870,405 A | * | 9/1989 | Fletcher | 340/568.1 |
| 5,067,573 A | * | 11/1991 | Uchida | 345/173 |
| 5,483,262 A | * | 1/1996 | Izutani | 345/179 |
| 5,501,535 A | * | 3/1996 | Hastings et al. | 400/88 |
| 5,608,390 A | * | 3/1997 | Gasparik | 340/870.01 |
| 5,614,886 A | * | 3/1997 | Snell et al. | 340/571 |
| 5,635,959 A | * | 6/1997 | Takeuchi et al. | 345/179 |
| 5,883,338 A | * | 3/1999 | Trunck et al. | 178/19.07 |
| 6,114,958 A | * | 9/2000 | Murphy | 340/568.1 |
| 6,441,810 B1 | * | 8/2002 | Skoog et al. | 345/179 |
| 7,116,225 B2 | * | 10/2006 | Lai et al. | 340/568.1 |
| 7,522,158 B2 | * | 4/2009 | Carlson et al. | 345/179 |
| 7,676,945 B2 | * | 3/2010 | Prestidge et al. | 33/559 |
| 7,705,837 B2 | * | 4/2010 | Locker et al. | 345/179 |
| 7,991,913 B2 | * | 8/2011 | Yan et al. | 709/245 |
| 8,059,108 B2 | * | 11/2011 | Carlson et al. | 345/179 |

FOREIGN PATENT DOCUMENTS

| | | |
|---|---|---|
| CN | 2716897 Y | 8/2005 |
| CN | 1987754 A | 6/2007 |
| CN | 101344827 A | 1/2009 |
| TW | 200641592 A | 12/2006 |
| TW | M323608 | 12/2007 |

OTHER PUBLICATIONS

Office Action from China Patent Office dated Jan. 30, 2012.
China Official Action issued on Aug. 10, 2012 Taiwan Official Action issued on Jun. 27, 2007.

\* cited by examiner

*Primary Examiner* — Travis Hunnings
(74) *Attorney, Agent, or Firm* — Chun-Ming Shih

(57) ABSTRACT

A digital electronic apparatus includes a touch display panel, an active touch pen and a power shortage reminding module. The active touch pen is suitable for inputting signals to the touch display panel. The power shortage reminding module is disposed in one of the touch display panel and the active touch pen. The power shortage reminding module is suitable for monitoring a remaining power of the active touch pen and prompting the touch display panel to send out a reminding signal for charging the active touch pen, and therefore, the active touch pen can be timely charged, which prevents the power of the active touch pen be exhausted in use.

8 Claims, 3 Drawing Sheets

DIGITAL ELECTRONIC APPARATUS

CROSS-REFERENCE TO RELATED APPLICATIONS

This application is based upon and claims the benefit of priority from the prior Taiwanese Patent Application No. 098114283, filed Apr. 29, 2009, the entire contents of which are incorporated herein by reference.

BACKGROUND

1. Field of the Invention

The present invention relates to a digital electronic apparatus, and more particularly, to a digital electronic apparatus with power shortage reminding function.

2. Description of the Related Art

In recent years, due to the advantage of easy control, touch display panels applying touch sensing technologies have been widely used in various electronic apparatuses, particularly in portable electronic apparatuses.

Touch sensing technologies can be divided into various types according to the operation principles, such as resistive type, capacitive type, and electromagnetic induction type. The electromagnetic induction type touch display panel needs to be used accompanying with an electromagnetic touch pen, for utilizing the electromagnetic induction effect generated between the electromagnetic touch pen and the electromagnetic induction type touch display panel. Thus, the electromagnetic induction type touch display panel can sense a signal input by the electromagnetic touch pen. The kind of signal inputting manner makes the user only need to utilize the electromagnetic touch pen to write down the information on the electromagnetic induction type touch display panel when the user wants to input information, which makes the electronic apparatus is easy to be controlled.

The electromagnetic touch pen is usually divided into active touch pen and passive touch pen, wherein the active touch pen has a built-in battery. However, because the conventional electronic apparatus does not have a power shortage reminding function for the active touch pen, the power of the active touch pen is often exhausted when the user utilizes the active touch pen to input information. This inconveniences users too much.

BRIEF SUMMARY

The present invention provides a digital electronic apparatus with power shortage reminding function for an active touch pen.

In order to achieve above-mentioned advantages, the present invention provides a digital electronic apparatus including a touch display panel, an active touch pen and a power shortage reminding module. The active touch pen is suitable for inputting signals to the touch display panel. The power shortage reminding module is disposed in one of the touch display panel and the active touch pen. The power shortage reminding module is suitable for monitoring a remaining power of the active touch pen and prompting the touch display panel to send out a reminding signal for charging the active touch pen, and therefore, the active touch pen can be timely charged, which prevents the power of the active touch pen from being exhausted in use.

In one embodiment of the present invention, the touch display panel includes a charging slot, and the active touch pen is suitable for being inserted into the charging slot and being electrically connected to the charging slot.

In one embodiment of the present invention, the power shortage reminding module is disposed in the touch display panel, and the power shortage reminding module is suitable for counting a duration of the active touch pen and the charging slot being electrically insulated and suitable for prompting the touch display panel to sending out the reminding signal for charging the active touch pen when the duration reaches or exceeds a first predetermined value.

In one embodiment of the present invention, the power shortage reminding module is software.

In one embodiment of the present invention, the touch display panel includes a rechargeable battery and a power management module, and the power shortage reminding module is integrated to the power management module.

In one embodiment of the present invention, the power shortage reminding module is disposed in the active touch pen, and the power shortage reminding module is suitable for monitoring the remaining power of the active touch pen, and suitable for prompting the touch display panel to send out the reminding signal for charging the active touch pen when the remaining power of the active touch pen being equal to or less than a second predetermined value.

In one embodiment of the present invention, the power shortage reminding module is a simulating circuit.

In one embodiment of the present invention, the reminding signal is an image signal and the image signal is displayed on the touch display panel.

In one embodiment of the present invention, the image signal is a flicker battery symbol.

In one embodiment of the present invention, the reminding signal is a sound signal, and the sound signal is sounded by a loudspeaker of the touch display panel.

In one embodiment of the present invention, the touch display panel includes an electromagnetic induction type touch panel, and a display panel disposed on the electromagnetic induction type touch panel.

In one embodiment of the present invention, the display panel is a reflective display panel.

The digital electronic apparatus of the present invention includes the power shortage reminding module for prompting the touch display panel to send out the reminding signal for reminding the user to charge the active touch pen when the remaining power of the active touch pen is insufficient. Therefore, the user can be informed before the power of the active touch pen being exhausted, and power exhaustion of the active touch pen 220 will not inconvenience the user too much.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
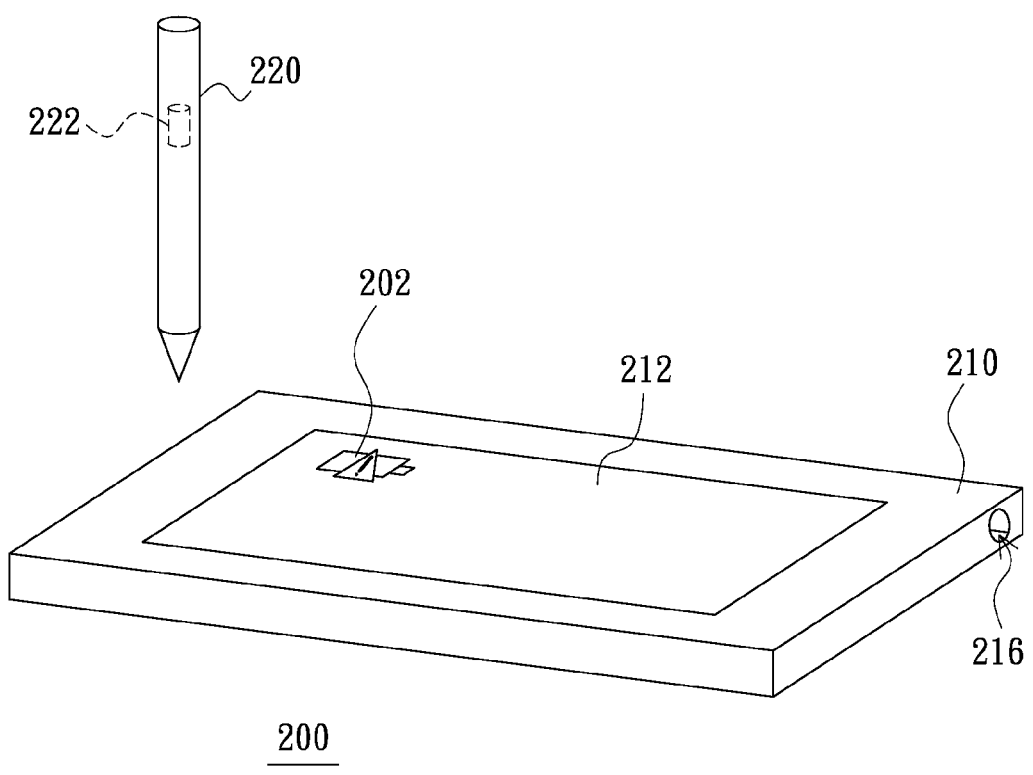
FIG. 1 is a schematic view of a digital electronic apparatus of an embodiment of the present invention.
Figure 2:
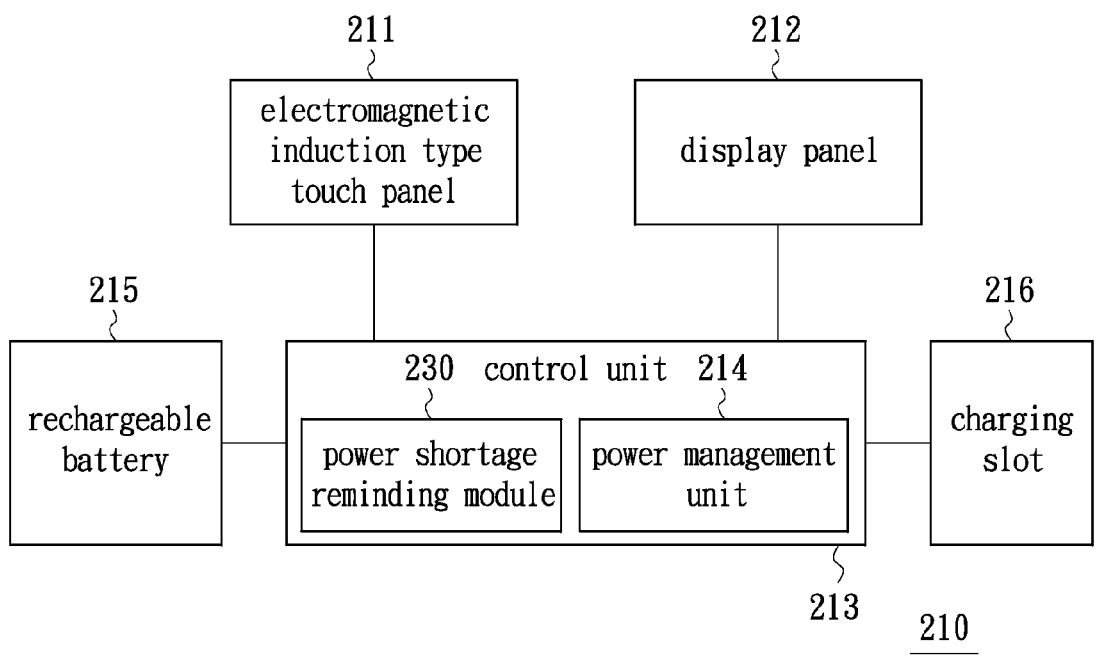
FIG. 2 is a block diagram of the touch display panel of FIG. 1.

FIG. 1 is a schematic view of a digital electronic apparatus of an embodiment of the present invention, and FIG. 2 is a block diagram of the touch display panel of FIG. 1. Referring to FIGS. 1 and 2, the digital electronic apparatus 200 of the embodiment can be, but not limited to, a desktop touch computer or a portable electronic apparatus, such as a notebook personal computer, a personal digital assistant, a mobile phone, or an electronic-book device. The digital electronic apparatus 200 includes a touch display panel 210, an active touch pen 220 and a power shortage reminding module 230. The active touch pen 220 is suitable for inputting signals to the touch display panel 210. The power shortage reminding module 230 is disposed in one of the touch display panel 210 and the active touch pen 220. In this embodiment, the power shortage reminding module 230 is disposed in the touch display panel 210. The power shortage reminding module 230 is suitable for monitoring a remaining power of the active touch pen 220 and prompting the touch display panel 210 to send out a reminding signal for charging the active touch pen 220.

In the digital electronic apparatus 200, the active touch pen 220 is, for example, an electromagnetic touch pen, which includes a battery 222, and the active touch pen 220 is suitable for sending electromagnetic signals to the touch display panel 210. The touch display panel 210, for example, includes an electromagnetic induction type touch panel 211 and a display panel 212, wherein the display panel 212 is disposed above or below the electromagnetic induction type touch panel 211. The display panel 212 may be a reflective display panel, such as electrophoretic display panel, electrowetting display panel. The display panel 212 also may be any other type of display panel, such as liquid crystal display panel or organic light emitting diode display panel. In addition, the touch display panel 210 further includes a control unit 213, which is electrically connected to the electromagnetic induction type touch panel 211 and the display panel 212, and the power shortage reminding module 230 is, fox example, integrated to the control unit 213. The control unit 213 is suitable for receiving input signals from the electromagnetic induction type touch panel 211, and controlling the display panel 212 to display a corresponding image or execute a corresponding processing operation.

In the embodiment that the digital electronic apparatus 200 is portable electronic apparatus, the touch display panel 210 further includes a power management module 214 and a rechargeable battery 215. The rechargeable battery 215, for example, is electrically connected to the power management module 214 of the control unit 213, and is suitable for providing electric power to the touch display panel 210 when the digital electronic apparatus 200 is disconnected with an external power supply. Otherwise, the power shortage reminding module 230 and the power management module 214 may be independent with each other. In another embodiment of the present invention, the power shortage reminding module 230 may be integrated to the power management module 214. In addition, the touch display panel 210 may further include a charging slot 216, and the active touch pen 220 is suitable for being inserted into the charging slot 216 and being electrically connected to the charging slot 216. The charging slot 216 is suitable for charging the active touch pen 220 when the active touch pen 220 is inserted into and electrically connected to the charging slot 216.

In the embodiment, the power shortage reminding module 230 may be software. The power shortage reminding module 230 is suitable for calculating the remaining power of the battery 222 of the active touch pen 220 by means of counting a duration of the active touch pen 220 and the charging slot 216 being electrically insulated, and suitable for prompting the touch display panel 210 to send out the reminding signal for charging the active touch pen 220 when the duration reaches or exceeds a first predetermined value.

The first predetermined value may be a predetermined duration, and the length of the duration may be a fixed value or changed according to the remaining power of the battery 222 of the active touch pen 220. For example, supposing the active touch pen 220 can be continuously used for 100 minutes if the battery 222 of the active touch pen 220 is fully charged. Before the active touch pen 220 and the charging slot 216 being electrically insulated, the remaining power of the battery 222 of the active touch pen 220 is 100%, and the first predetermined value is, for example, 90 minutes. That is, when the active touch pen 220 and the charging slot 216 are electrically insulated for 90 minutes or more than 90 minutes, the power shortage reminding module 230 will prompt the touch display panel 210 to send out the reminding signal for charging the active touch pen 220. In addition, if the remaining power of the battery 222 of the active touch pen 220 is 80% before the active touch pen 220 and the charging slot 216 being electrically insulated, the first predetermined value is, for example, 70 minutes.

The reminding signal may be an image signal 202, and the image signal 202 may be, but not limited to, a flicker battery symbol. The image signal 202 is displayed on the touch display panel 210. In addition, in another embodiment that the touch display panel 210 has a loudspeaker (not shown), the reminding signal may be a sound signal, and the sound signal may be sounded by the loudspeaker of the touch display panel 210.

In the present embodiment of the digital electronic apparatus 200, the power shortage reminding module 230 of the touch display panel 210 can prompt the touch display panel 210 to send out the reminding signal for reminding the user to charge the active touch pen 220 when the remaining power of the battery 222 of the active touch pen 220 is insufficient. Therefore, the user can be informed that the remaining power of the active touch pen 220 is insufficient in advance. Because the user can be informed before the power of the active touch pen being exhausted, power exhaustion of the active touch pen 220 will not inconvenience the user too much.

Figure 3:
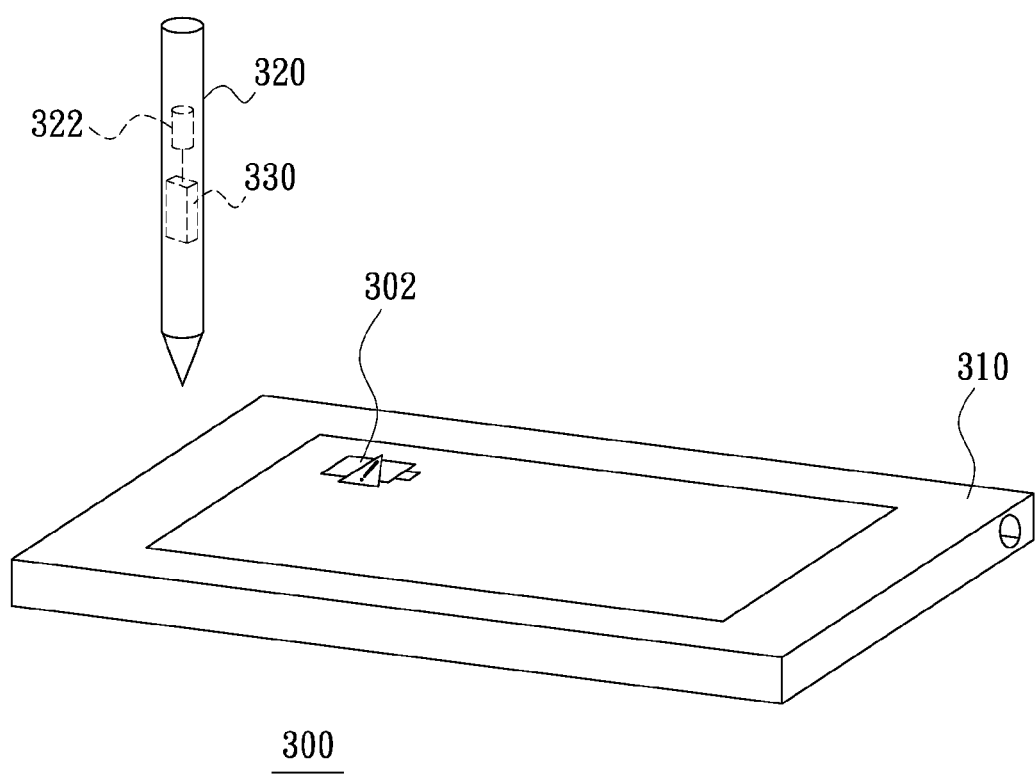
FIG. 3 is a schematic view of a digital electronic apparatus of another embodiment of the present invention.

FIG. 3 is a schematic view of a digital electronic apparatus of another embodiment of the present invention. Referring to FIG. 3, the digital electronic apparatus 300 is similar to the digital electronic apparatus 200, the difference is that the power shortage reminding module 330 of the digital electronic apparatus 300 is disposed in the active touch pen 320, but not in the touch display panel 310.

The power shortage reminding module 330 may be a simulating circuit. The power shortage reminding module 330 is suitable for monitoring the remaining power of the battery 322 of the active touch pen 320, and prompting the touch display panel 310 to send out a reminding signal for charging the active touch pen 320 when the remaining power of the battery 322 of the active touch pen 320 is equal to or less than a second predetermined value. The second predetermined value is, for example, a predetermined remaining power value. Concretely, the second predetermined value may be 10% of a maximum power of the battery 322 of the active touch pen 320. That is, when the remaining power of the battery 322 of the active touch pen 320 is equal to or less than 10% of the maximum power of the battery 322, the power shortage reminding module 330 prompts the touch display panel 310 to send out the reminding signal for charging the active touch pen 320. In addition, as similar to the above-mentioned embodiment, the reminding signal may be an image signal 302 or a sound signal.

The advantages of the digital electronic apparatus 300 of the present embodiment are similar to the advantages of the digital electronic apparatus 200 of the above-mentioned embodiment, and are not described herein. In addition, it should be noted that, the value mentioned in the foregoing embodiments are illustrated as examples, but not for limiting the present invention.

In summary, the digital electronic apparatus of the present invention includes the power shortage reminding module for prompting the touch display panel to send out the reminding signal for reminding the user to charge the active touch pen when the remaining power of the active touch pen is insufficient. Therefore, the user can be informed before the power of the active touch pen being exhausted, and the power exhaustion of the active touch pen will not inconvenience the user too much.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A digital electronic apparatus comprising:
a touch display panel;
an active touch pen suitable for inputting signals to the touch display panel; and
a power shortage reminding module disposed in the touch display panel, and suitable for monitoring a remaining power of the active touch pen and prompting the touch display panel to send out a reminding signal for charging the active touch pen,
wherein the touch display panel includes a charging slot, the active touch pen is suitable for being inserted into the charging slot and being electrically connected to the charging slot, the power shortage reminding module is suitable for counting a duration that the active touch pen and the charging slot have been electrically insulated, and the power shortage reminding module is also suitable for prompting the touch display panel to send out the reminding signal for charging the active touch pen when the duration reaches or exceeds a first predetermined value.

2. The digital electronic apparatus as claimed in claim 1, wherein the power shortage reminding module is software.

3. The digital electronic apparatus as claimed in claim 1, wherein the touch display panel includes a rechargeable battery and a power management module, and the power shortage reminding module is integrated to the power management module.

4. The digital electronic apparatus as claimed in claim 1, wherein the reminding signal is an image signal and the image signal is displayed on the touch display panel.

5. The digital electronic apparatus as claimed in claim 4, wherein the image signal is a flicker battery symbol.

6. The digital electronic apparatus as claimed in claim 1, wherein the reminding signal is a sound signal, and the sound signal is sounded by a loudspeaker of the touch display panel.

7. The digital electronic apparatus as claimed in claim 1, wherein the touch display panel comprising:
an electromagnetic induction type touch panel; and
a display panel disposed on the electromagnetic induction type touch panel.

8. The digital electronic apparatus as claimed in claim 7, wherein the display panel is a reflective display panel.

* * * * *